United States Patent
Chen et al.

(10) Patent No.: US 12,107,515 B2
(45) Date of Patent: Oct. 1, 2024

(54) SINGLE-PHASE SEVEN-LEVEL INVERTER

(71) Applicant: Wayne State University, Detroit, MI (US)

(72) Inventors: Jianfei Chen, Lanham, MD (US); Caisheng Wang, Troy, MI (US)

(73) Assignee: Wayne State University, Detroit, MI (US)

( * ) Notice: Subject to any disclaimer, the term of this patent is extended or adjusted under 35 U.S.C. 154(b) by 149 days.

(21) Appl. No.: 17/780,225

(22) PCT Filed: Nov. 25, 2020

(86) PCT No.: PCT/US2020/062293
§ 371 (c)(1),
(2) Date: May 26, 2022

(87) PCT Pub. No.: WO2021/108604
PCT Pub. Date: Jun. 3, 2021

(65) Prior Publication Data
US 2022/0416685 A1    Dec. 29, 2022

Related U.S. Application Data

(60) Provisional application No. 62/941,487, filed on Nov. 27, 2019.

(51) Int. Cl.
*H02M 7/487* (2007.01)
*H02M 7/5387* (2007.01)

(52) U.S. Cl.
CPC ....... *H02M 7/487* (2013.01); *H02M 7/53873* (2013.01)

(58) Field of Classification Search
CPC ............. H02M 7/487; H02M 7/53873; H02M 7/5395; H02M 7/5388
See application file for complete search history.

(56) References Cited

U.S. PATENT DOCUMENTS 9,009,956 B2 *   4/2015   Xue .................... H02M 7/4835
                                                         361/717
9,735,664 B2 *   8/2017   Lavieville ........... H02M 7/4837
(Continued)

FOREIGN PATENT DOCUMENTS

EP         3493391 A1     6/2019

OTHER PUBLICATIONS

N.A. Rahim, K. Chaniago, and J. Selvaraj, "Single-Phase Seven-Level Grid-Connected Inverter for Photovoltaic System," IEEE Transactions on Industrial Electronics, vol. 58, No. 6, pp. 2435-2443, Jun. 2011.

(Continued)

*Primary Examiner* — Yusef A Ahmed
(74) *Attorney, Agent, or Firm* — Fishman Stewart PLLC

(57) ABSTRACT

An exemplary system includes an inverter coupled to a DC source, eight power switches and three DC-link capacitors that synthesize seven output voltage levels. In one example the inverter includes a four-level active neutral pointed clamped inverter (4L-ANCP) that includes six power switches of the eight power switches is operated at a switching frequency with a first voltage stress level, and a half-bridge that includes the other two of the eight power switches is coupled to the 4L-ANCP and operated at a fundamental frequency with a second voltage stress, the second voltage stress being higher than the first voltage stress level.

12 Claims, 12 Drawing Sheets

(56) References Cited

U.S. PATENT DOCUMENTS

| | | | |
|---|---|---|---|
| 9,748,862 B2* | 8/2017 | Cheng | H02M 7/487 |
| 10,951,131 B2* | 3/2021 | Shi | H02M 7/487 |
| 11,716,032 B2* | 8/2023 | Xu | H02M 1/32 |
| | | | 363/98 |
| 2011/0110136 A1* | 5/2011 | Lacarnoy | H02M 7/483 |
| | | | 307/65 |
| 2011/0193412 A1* | 8/2011 | Lacarnoy | H02M 7/487 |
| | | | 307/75 |
| 2012/0033474 A1* | 2/2012 | Temesi | H02M 7/483 |
| | | | 363/131 |
| 2013/0249322 A1* | 9/2013 | Zhang | H02M 1/0095 |
| | | | 307/151 |
| 2013/0270917 A1* | 10/2013 | Yatsu | H02M 7/483 |
| | | | 307/77 |
| 2013/0272045 A1* | 10/2013 | Soeiro | H02M 7/487 |
| | | | 363/131 |
| 2013/0301314 A1* | 11/2013 | Fu | H02M 7/487 |
| | | | 363/37 |
| 2014/0198536 A1* | 7/2014 | Fu | H02M 1/14 |
| | | | 363/17 |
| 2014/0241019 A1* | 8/2014 | Divan | H02M 7/217 |
| | | | 363/126 |
| 2015/0131348 A1* | 5/2015 | Rasoanarivo | H02M 7/483 |
| | | | 363/123 |
| 2015/0333658 A1* | 11/2015 | Lavieville | H02M 7/4837 |
| | | | 318/400.26 |
| 2016/0126862 A1* | 5/2016 | Vahedi | H02M 7/537 |
| | | | 363/131 |
| 2016/0268924 A1* | 9/2016 | Fu | H02M 7/483 |
| 2017/0099013 A1* | 4/2017 | Martini | H02M 7/487 |
| 2017/0194877 A1* | 7/2017 | Kadam | H02M 7/4837 |
| 2018/0062537 A1* | 3/2018 | Wang | H02M 1/08 |
| 2018/0097453 A1* | 4/2018 | Xu | H02P 27/06 |
| 2020/0007050 A1* | 1/2020 | Fu | H02M 7/4837 |
| 2020/0021203 A1* | 1/2020 | Xie | H02M 7/5395 |
| 2021/0067057 A1* | 3/2021 | Abarzadeh | H02M 7/4837 |
| 2021/0344279 A1* | 11/2021 | Sharifzadeh | H02M 7/4833 |

OTHER PUBLICATIONS

C.E.S. Feloups, A.I.M. Ali, and E.E.M. Mohamed, "Single-phase seven-level PWM inverter for PV systems employing multi-level boost converter," in 2018 International Conference on Innovative Trends in Computer Engineering (ITCE 2018), Aswan University, Egypt, 2018, pp. 403-409.

J. Chen, D. Liu, K. Ding, C. Wang and Z. Chen, "A Single-Phase Double T-Type Seven-Level Inverter," 2018 IEEE Energy Conversion Congress and Exposition (ECCE), 2018, pp. 6344-6349, doi: 10.1109/ECCE.2018.8558148.

D. S. Sudheer, S. Reddy, J. S. Kumar, C. B. Ayyapparaju and M. S. Reddy, "A Single-Phase Inverter Topology with Seven-Level Output based on T-type Structure," 2021 6th International Conference for Convergence in Technology (I2CT), Pune, India, Apr. 2-4, 2021, pp. 1-4, doi: 10.1109/I2CT51068.2021.9417969.

ISR dated Mar. 3, 2021 for copending International Patent App. No. PCT/US2020/062293.

S. S. Kumar and M. Sasikumar, "An approach of hybrid modulation in fusion seven-level cascaded multilevel inverter accomplishment to IM drive system," 2016 Second International Conference on Science Technology Engineering and Management (ICONSTEM), 2016, pp. 383-387, doi: 10.1109/ICONSTEM.2016.7560980.

J. Chen, C. Wang and J. Li, "A Single-Phase Step-Up Seven-Level Inverter With a Simple Implementation Method for Level-Shifted Modulation Schemes," in IEEE Access, vol. 7, pp. 146552-146565, 2019, doi: 10.1109/ACCESS.2019.2946238.

\* cited by examiner $S_1 = \overline{A}\overline{B}\overline{C}\overline{D} \| AB$

FIG. 5A $S_2 = \overline{A}\overline{B}\overline{C}\overline{D} \| A\overline{B}C$

FIG. 5B $S_3 = AB \| AC \| \overline{A}\overline{B}\overline{C}$

FIG. 5C $S_4 = \overline{A}B \| \overline{A}C \| A\overline{B}\overline{C}$

FIG. 5D $S_5 = \bar{A}\bar{B}C \| A\bar{B}\bar{C}D$

FIG. 5E $S_6 = A\bar{B}\bar{C}D \| \bar{A}B$

FIG. 5F $S_7 = \bar{A}$

SINGLE-PHASE SEVEN-LEVEL INVERTER

CROSS-REFERENCE TO RELATED APPLICATIONS

This application claims priority to and is a National Phase of International Patent Application No. PCT/US2020/062293, filed on Nov. 25, 2020, which claims the benefit of U.S. Provisional Patent Application 62/941,487 filed Nov. 27, 2019, the contents of each of which is hereby incorporated by reference in their entirety.

FIELD OF TECHNOLOGY

Exemplary fields of technology for the present disclosure may relate to, for example, a single-phase seven-level inverter.

BACKGROUND

High efficiency and compact single-phase inverters are desirable in many industry applications, such as solar energy harvesting, electric vehicle chargers. A popular single-phase inverter topology is a full-bridge inverter with bipolar pulse width modulation, unipolar pulse width modulation, or hybrid modulation. In this example, the four power switches are operated at high switching frequency with the bipolar and unipolar pulse width modulation, which may not ensure high-efficient operation. Comparatively, a hybrid modulation helps achieve better efficiency. However, because the switching voltage of the power switches are at full DC-link voltage or twice the full DC-link voltage, the output filter has a larger value to mitigate the high dv/dt and current harmonics.

In recent years, many single-phase multilevel inverter topologies have been proposed, mainly including three-level, five-level and seven-level inverters. The more output voltage levels, the less output harmonics. Thus, the output waveforms have lower total harmonic distortion even with a smaller filter. However, more output voltage levels also mean smaller switching voltage, which brings in reducing switching losses. Therefore, single-phase seven-level inverters have some advantages over five-level and three-level inverters in some applications where high-power density and high efficiency is more desirable than other considerations.

Existing single-phase seven-level inverters mainly include one cascaded seven-level inverter with three independent DC input sources and with only one DC input source. The cascaded seven-level inverter may not be a good solution to high power density application due to many power devices and three independent dc sources. Additionally, how to balance the three independent DC sources is another challenge. Comparatively, single-phase seven-level inverters with only one DC input source may be generally more suitable for high power density applications. Several such topologies with three DC-link capacitors in series have been proposed. These know topologies have a common DC-link configuration that includes three series-connected capacitors, and the capacitor voltages are hard to be balanced as there are not enough redundant switching states that could be selected to balance the capacitor voltages.

In addition, one known single-phase seven-level inverter topology is a packed U-cell seven-level (PUC7) inverter. It is featured with only six power switches, one dc source and one flying capacitor. Comparatively, the PUC7 inverter has the least quantity of power devices among all single-phase seven-level inverter topologies. However, this advantage is realized at the expense of using an additional flying capacitor. There is also a twice-line-frequency power ripple at the flying capacitor besides the one at the DC-link capacitor. As a result, a compact design of the PUC7 has challenges. A known, modified PUC7 inverter includes replacing the flying capacitor of the PUC7 inverter by one more DC source. As a result, there are two DC sources with different voltages, which limits its applications in industry. Other single-phase seven-level inverter topologies are a switched-capacitor based single-phase seven-level inverters. Though they have more components than the single-phase seven-level inverters with three series-connected DC-link capacitors, they do not account for capacitor voltage balancing due to automatic voltage balancing capability. Considering large inrush current produced when two capacitors are switched in parallel during one switching period, this kind of switched-capacitor inverter is not suitable for practical applications.

A single-phase cascaded seven-level inverter can be developed by cascading three H-bridge circuits. It can be implemented using phase-shifted carrier modulation, which can increase the equivalent switching frequency and reduce output harmonics. However, twelve power switches and three independent dc sources would be used in that implementation, which greatly increases cost.

The three independent dc sources limit its wide applications. On the other hand, a simple seven-level inverter topologies may be used with reduced power switches. For example, a two-stage conversion system with one front dc/dc converter may be used. As a result, design cost is increased, and conversion efficiency is reduced. Moreover, using a fewer number of isolated dc sources means not requiring too many maximum powers point tracking (MPPT) controllers to control output power and voltage of each separated solar arrays, resulting in a simpler structure of energy generation system.

Thus, there is a need for an improved inverter.

BRIEF DESCRIPTION OF THE DRAWINGS

FIGS. 5A-5H illustrate Karnaugh Maps of the switching signals;

DETAILED DESCRIPTION

An exemplary system according to the disclosure includes a single-phase seven-level inverter topology with only eight power switches and three series-connected dc-link capacitors is disclosed. Compared to an existing single-phase seven-level inverter, quantity of power switches and voltage stresses across them are both reduced. Modulation logic expression of every power switch may be achieved based on a Karnaugh Map technique. According to the disclosure, a voltage-balance control strategy based on a special level-shifted carrier modulation scheme may be implemented to control the middle capacitor voltage at the desired ⅓ of the DC-link voltage and the upper and lower capacitor voltages are automatically balanced.

A topology referred to as single-phase active neutral point clamped seven-level (SANPC-7L) inverter is disclosed. It is implemented based on one active neutral point clamped (4L-ANPC) and one half-bridge. The 4L-ANPC half bridge operates at switching frequency while the half-bridge works at the fundamental frequency. Four output voltage levels ($U_{dc}$, $\frac{2}{3}U_{dc}$, $\frac{1}{3}U_{dc}$, 0) are achieved by the 4L-ANPC half-bridge. With the unfolding function of the fundamental half-bridge, eight voltage levels ($U_{dc}$, $\frac{2}{3}U_{dc}$, $\frac{1}{3}U_{dc}$, 0+, 0−, $-\frac{1}{3}U_{dc}$, $-\frac{2}{3}U_{dc}$, $-U_{dc}$) are achieved. Considering there are two redundant zero voltage levels, there are seven different voltage levels in the disclosed inverter.

To implement the disclosed modulation scheme of the SANPC-7L inverter, its modulation logic expression of every power switch is derived based on the Karnaugh Map technique and switching states of the SANPC-7L inverter. As for a capacitor voltage imbalanced issue, a variable-reference voltage-balance control technique is used to control and balance the three series-connected capacitors.

As described with reference to the figures, a single-phase seven-level inverter topology is disclosed. The inverter includes a single dc source, eight power switches and three DC-link capacitors for synthesizing seven output voltage levels. Six power switches operate at high frequency with low voltage stresses and the other two power switches operate at a fundamental frequency (50 Hz or 60 Hz, as examples) with high voltage stresses. A modulation logic expression of every power switch is derived based on a Karnaugh Map technique and then a voltage-balance control strategy controls and balances a middle DC-link capacitor voltage at a desired ⅓ of the DC-link voltage. Meanwhile, the other two DC-link capacitor voltages are automatically balanced.

Figure 1:
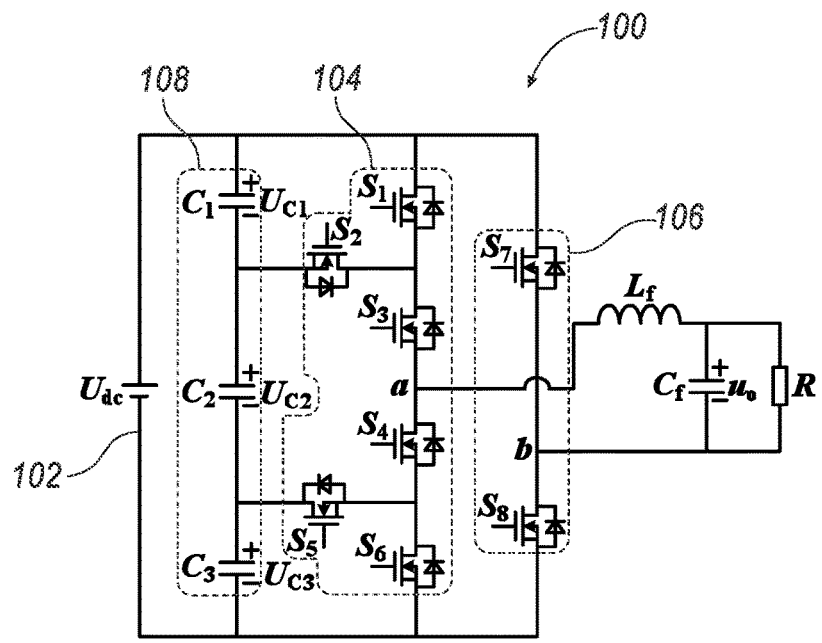
FIG. 1 shows the circuit configuration of the disclosed SANPC-7L inverter.

FIG. 1 shows the circuit configuration of the disclosed SANPC-7L inverter 100. Inverter has eight power switches $S_1$, $S_2$, $S_3$, $S_4$, $S_5$, $S_6$, $S_7$, $S_8$ 104/106 and three series-connected DC-link capacitors $C_1$, $C_2$, $C_3$ 108. Power switches $S_7$, $S_8$ complement each other and are switched at a fundamental frequency, such as 50 Hz or 60 Hz for grid-connected applications. $U_{C1}$, $U_{C2}$, $U_{C3}$, are capacitor voltages of $C_1$, $C_2$, $C_3$ and $C_1$, $C_2$, $C_3$ have the same capacitance; $U_{dc}$ is the input DC-link voltage; $u_{ab}$ is a terminal voltage between the neutral points a and b; and $u_0$ is an output voltage of a load R. Equivalent circuits of the disclosed SANPC-7L inverter 100 are presented in FIGS. 4A-4H, where bold and black line indicate a conduction path, and dimmed illustrations of the circuit, in each figure, illustrate paths where no conduction occurs due to its switched state within inverter 100. There are eight switching states to achieve the seven output voltage levels ($U_{dc}$, $\frac{2}{3}U_{dc}$, $\frac{1}{3}U_{dc}$, 0, $-\frac{1}{3}U_{dc}$, $-\frac{2}{3}U_{dc}$, $-U_{dc}$).

According to the disclosure, inverter 100 is coupleable to a DC source 102, the inverter including seven levels that include eight power switches and three DC-link capacitors that synthesize seven output voltage levels. Inverter 100 includes a four-level active neutral pointed clamped inverter (4L-ANCP) 104 that includes six power switches of the eight power switches 106/106 and is operated at a switching frequency with a first voltage stress level. Inverter 100 includes a half-bridge 106 that includes the other two of the eight power switches 104/106 and is coupled to 4L-ANCP 104 and operated at a fundamental frequency with a second voltage stress, the second voltage stress being higher than the first voltage stress level.

Figure 2:
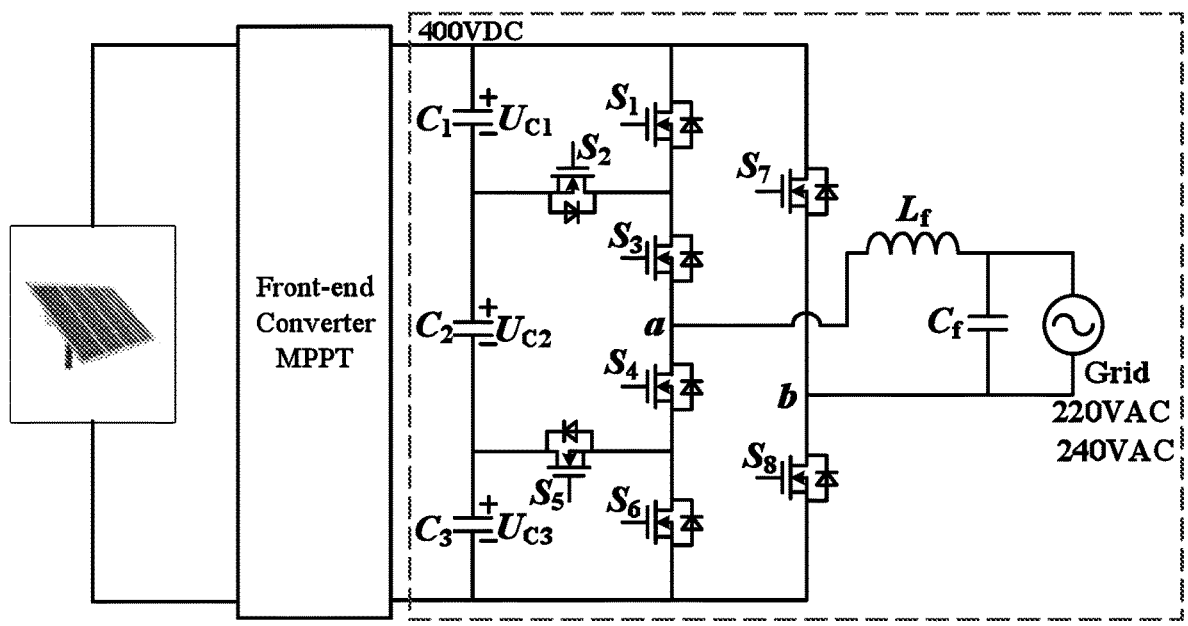
FIG. 2 illustrates a solar generation system based on a two-stage conversion approach.
Figure 3:
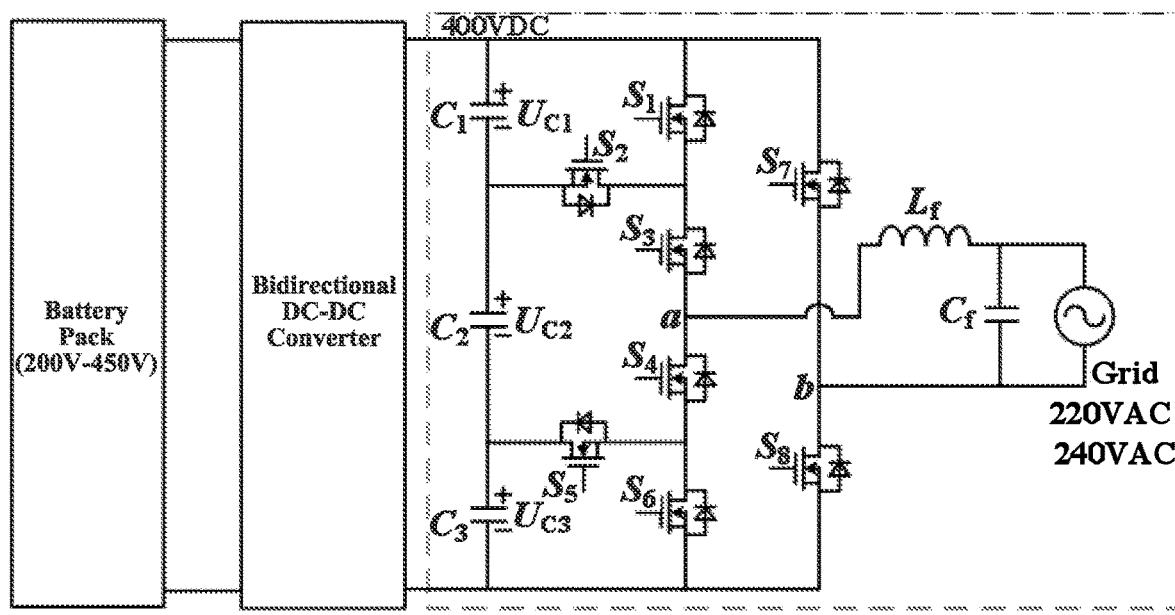
FIG. 3 illustrates a bi-directional arrangement of the disclosed topology.

FIG. 2 illustrates a solar generation system based on a two-stage conversion approach. The first converter functions as the maximum power point tracker (MPPT) and delivers energy into an intermediate link bus. This bus can be a DC voltage or modulated with a low frequency (twice that of the grid). The inverter is then used to convert the DC voltage or intermediate bus into an Alternating Current (AC) that feeds into the grid. The disclosed topology realizes this configuration. The basis of the disclosed seven-level inverter allows for operation using lower voltage semiconductor devices in that the bus voltage is divided over three capacitors. A GaN device can provide both conduction and switching loss advantages over traditional insulated-gate bipolar transistors (IGBTs) and metal oxide silicon field effect transistors (MOSFETs), making them ideal candidates for use in a solar inverter. Also, on-board chargers often include high efficiency and high-power density. They also include bidirectional operation considering vehicle to grid function. The disclosed inverter therefore works in a bidirectional power flow arrangement. Together with a bidirectional DC-DC converter, a bidirectional on-board charger configuration can be developed, as shown in FIG. 3. Thus, FIG. 3 illustrates a bi-directional arrangement wherein the disclosed inverter configuration can be used conversely to charge a battery pack, as an example.

For both the two-stage solar generation system (FIG. 2) and the on-board charger system (FIG. 3), the DC-link voltage 400V could be divided into 133.3 V levels, the switches $S_1$, $S_2$, $S_5$, $S_6$ can use 200V devices; the switches $S_3$, $S_4$ can use 400V devices; and the switches $S_7$, $S_8$ can use 600V devices. As such, the disclosed topology enables the use of different components in select locations (i.e., switches $S_1$, $S_2$, $S_5$, $S_6$ and switches $S_7$, $S_8$). Since $S_7$, $S_8$ are switched at the fundamental frequency 50 Hz or 60 Hz depending on the application, there is only conduction loss (the switching loss is nearly zero and can be ignored). The other six switches $S_1$, $S_2$, $S_3$, $S_4$, $S_5$, $S_6$ are switched at the high switching frequency. However, compared to the conventional solution using 600V devices, the conduction loss and switching loss of $S_1$, $S_2$, $S_3$, $S_4$, $S_5$, $S_6$ can be reduced considering using 200V or 400V devices. Thus, the efficiency can be improved as well. Furthermore, the reactive filter size can be significantly reduced due to the seven-level conversion topology. The dv/dt is greatly reduced compared to the conventional two-level inverter and lower harmonics will be produced in the disclosed inverter, leading to both high power density and a compact design.

There are seven output voltage levels in the disclosed inverter, and equivalent circuits of it are presented in FIGS. 4A-4H. FIGS. 4A-4H show various switch arrangements, resulting in different conduction path arrangements according to the disclosure, where the bold line represent the conduction path, and non-conducting paths are dim or less bold due to the representative switch being in an open and nonconducting mode Positive output level $U_{dc}$ (FIG. 4A): The total input voltage $U_{dc}$ is applied to the load as the switches $S_1$, $S_3$ and $S_8$ are conducted. At this stage, the three DC-link capacitors discharge energy to the load R. The three capacitors $C_1$, $C_2$ and $C_3$ are charged in series by the input source $U_{dc}$. Thus, focusing on FIG. 4A, switches $S_2$, $S_5$, $S_4$, $S_6$, $S_7$ are in an open mode and are shown in the FIG. 4A in light or dimmed, and switches $S_1$, $S_3$ and $S_8$ are conducted and therefore shown in FIG. 4A as bold. The arrangements of switches and their states with this and FIGS. 4B-4H correspond as well with Table I.

Positive output level ⅔$U_{dc}$ (FIG. 4B): The voltage ($U_{C2}$+$U_{C3}$) is applied to the load R as the switches $S_2$, $S_3$ and $S_8$ are conducted. At this stage, the capacitors $C_2$ and $C_3$ discharge energy to the load R. The two capacitors $C_2$ and $C_3$ provide energy to the load while the capacitor $C_1$ is charged by the input source $U_{dc}$.

Positive output level ⅓$U_{dc}$ (FIG. 4C): $U_{C3}$ is applied to the load R as the switches $S_4$, $S_5$ and $S_8$ are conducted. At this stage, the capacitor $C_3$ discharge energy to the load R as well as charging by the input source $U_{dc}$. The capacitor $C_3$ provides energy to the load while the capacitors $C_1$ and $C_2$ are charged by $U_{dc}$.

Zero output level (FIG. 4D, FIG. 4E): During these two stages, zero voltage is applied to the load R. The three capacitors $C_1$, $C_2$ and $C_3$ are charged in series by $U_{dc}$.

Negative output level −⅓$U_{dc}$ (FIG. 4F): −$U_{C1}$ is applied to the load R as the switches $S_2$, $S_3$ and $S_7$ are conducted. The two capacitors $C_2$ and $C_3$ are charged by $U_{dc}$ while the capacitor $C_1$ provides energy to the load.

Negative output level −⅔$U_{dc}$ (FIG. 4G): −($U_{C1}$+$U_{C2}$) is applied to the load R as the switches $S_4$, $S_5$ and $S_7$ are conducted. The capacitor $C_3$ is charged by $U_{dc}$ while the capacitors $C_1$ and $C_2$ provide energy to the load.

Negative output level −$U_{dc}$ (FIG. 4H): The total voltage −$U_{dc}$ is applied to the load R as the switches $S_4$, $S_6$ and $S_7$ are conducted. The three capacitors $C_1$, $C_2$ and $C_3$ are charged in series by $U_{dc}$.

According to FIGS. 4A-4H, a truth table of all switching states is developed in Table I where X is either 1 or 0. There are four logical output signals A, B, C, D. According to the truth table, Karnaugh Maps of all the switching signals of the switches $S_1$-$S_8$ are illustrated in FIGS. 5A-5H, and the logical expressions of all switching signals are achieved in formula (1).

$$\begin{cases} S_1 = \overline{ABCD} \parallel AB \\ S_2 = \overline{ABCD} \parallel \overline{ABC} \\ S_3 = AB \parallel AC \parallel \overline{ABC} \\ S_4 = \overline{AB} \parallel \overline{AC} \parallel \overline{ABC} \\ S_5 = \overline{ABC} \parallel \overline{ABCD} \\ S_6 = \overline{ABCD} \parallel \overline{AB} \\ S_7 = \overline{A} \\ S_8 = A \end{cases} \quad (1)$$

Figure 7A:
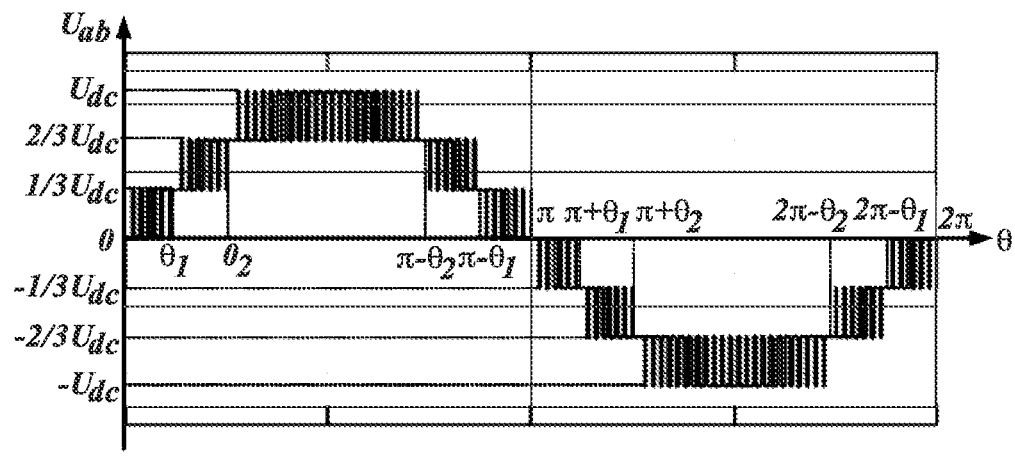
FIGS. 7A-C illustrate desired output waveforms under the three different conditions.
Figure 7B:
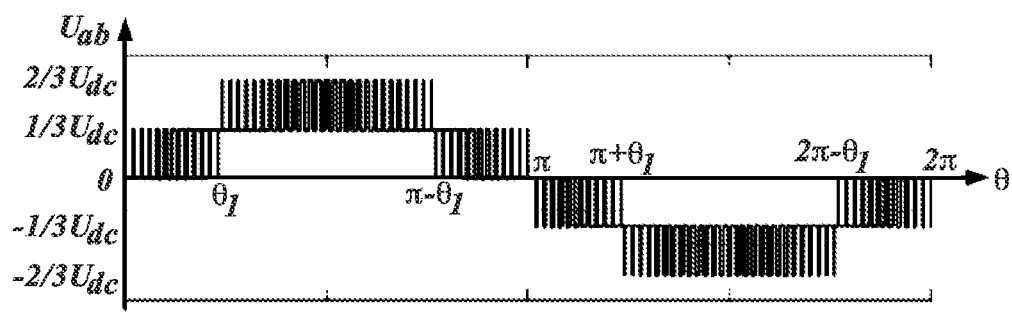
Figure 7C:
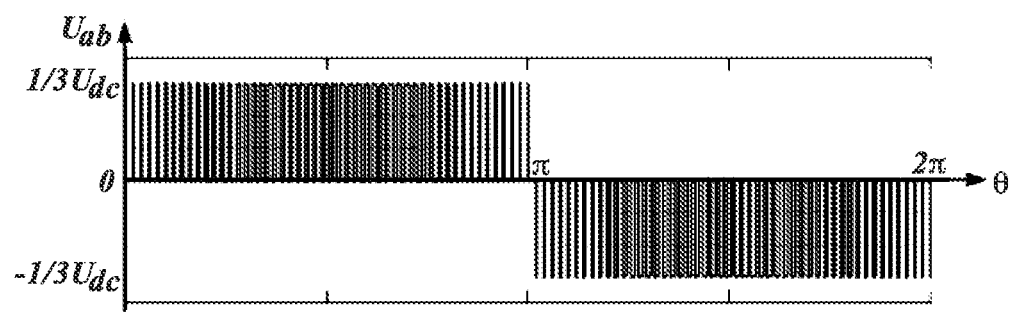

There is a capacitor imbalance to be accounted for. In a conventional level-shifted carrier modulation scheme, the output voltage $u_{ab}$ of the disclosed SANPC-7L inverter displays seven-level, five-level, and three-level shapes when the modulation index is among (⅔, 1), (⅓, ⅔], (0, ⅓], respectively. The desired output waveforms under the three different conditions are presented in FIGS. 7A, 7B, 7C. It should be noted that there are only switching states FIGS. 4B-4G when m is among (⅓, ⅔), and there are no switching states FIGS. 4C-4F when m is among (0, ⅓]. In FIGS. 8A-8C, the switching angles $\theta_1$ and $\theta_2$ meet for $$mV_{dc}\sin\theta_1 = \frac{1}{3}V_{dc} \quad (2)$$

$$mV_{dc}\sin\theta_2 = \frac{2}{3}V_{dc} \quad (3)$$

The capacitor voltage imbalance mechanism is due to an over discharge of the middle capacitor $C_2$ when the modulation index m is over ⅔. However, the capacitor voltage imbalance mechanism analysis is not comprehensive as it does not reveal the capacitor voltage imbalance mechanism when m is (⅓, ⅔] and (0, ⅓]. Thus, a simplified circuit model of the disclosed SANPC-7L inverter is presented in FIG. 8 where the input source $U_{dc}$ is considered. $I_{C1}$, $I_{C2}$, $I_{C3}$ are the average currents flowing through the capacitors $C_1$, $C_2$, $C_3$, respectively, and $I_1$, $I_2$, $I_3$ are three branch currents. $I_{dc}$ is the input current and the output sinusoidal lagging current $I_{dc}$ is defined by $I_m \sin(\theta-\varphi)$ where $\theta$, $\varphi$ and $I_m$ represents the switching angle, power factor angle, and output current amplitude, respectively.

Figure 8:
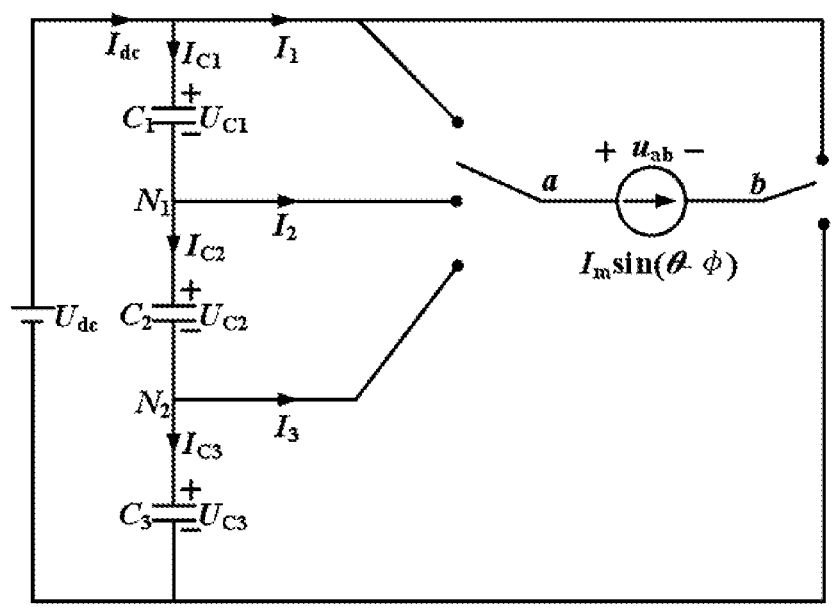
FIG. 8 illustrates a simplified circuit model of the disclosed SANPC-7L inverter.

According to FIG. 8, there are:

$$I_{C1} = I_{dc} - I_1 \quad (4)$$

$$I_{C2} = I_{C1} - I_2 \quad (5)$$

$$I_{C3} = I_{C2} - I_3 \quad (6)$$

When m is among (⅔, 1):

The average current $I_1$ is only effective during the switching states of FIGS. 4A and 4F-4H. Thus, the average current $I_1$ is expressed by:

$$I_1 = \frac{1}{2\pi}\left[\left(\int_{\theta_2}^{\pi-\theta_2} - \int_\pi^{2\pi}\right)I_m\sin(\theta-\varphi)\right]d\theta \quad (7)$$

TABLE I

Truth table and charging and discharging states of DC-link capacitors

Figure 4A:
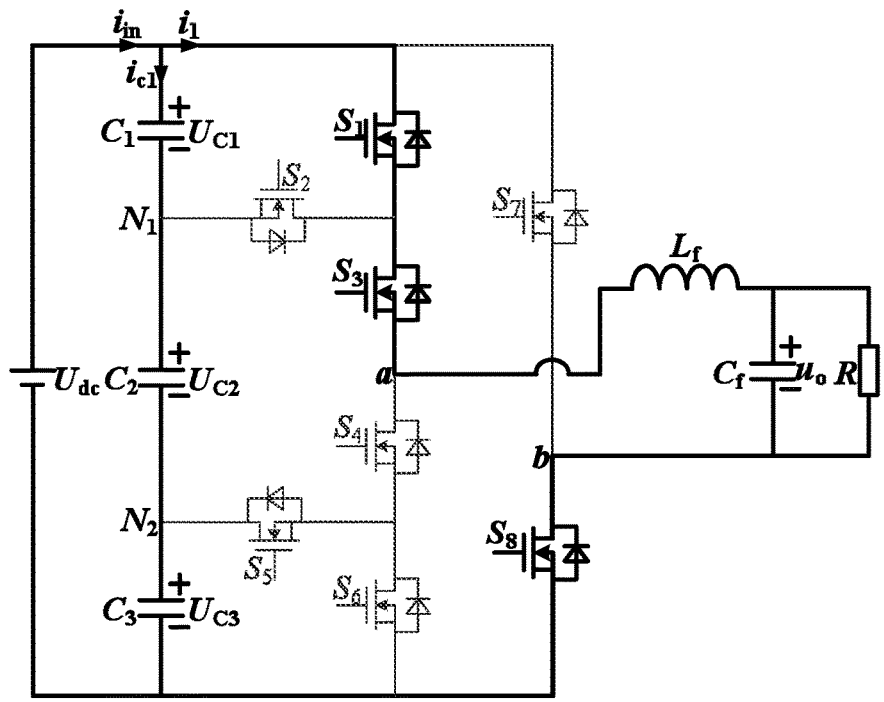
FIGS. 4A-4H illustrate switch arrangements at corresponding with Table I.
Figure 4B:
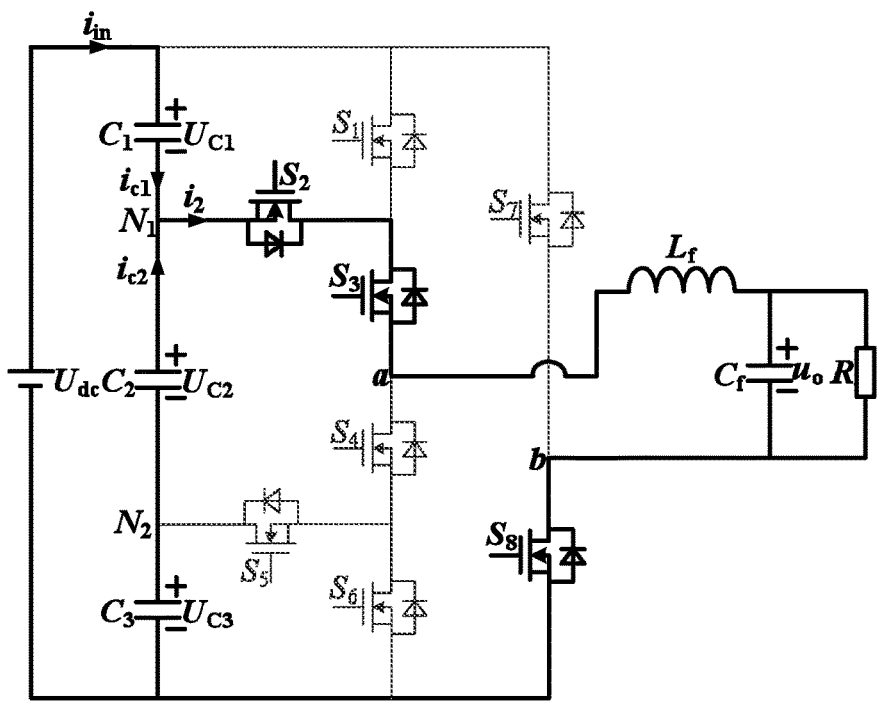
Figure 4C:
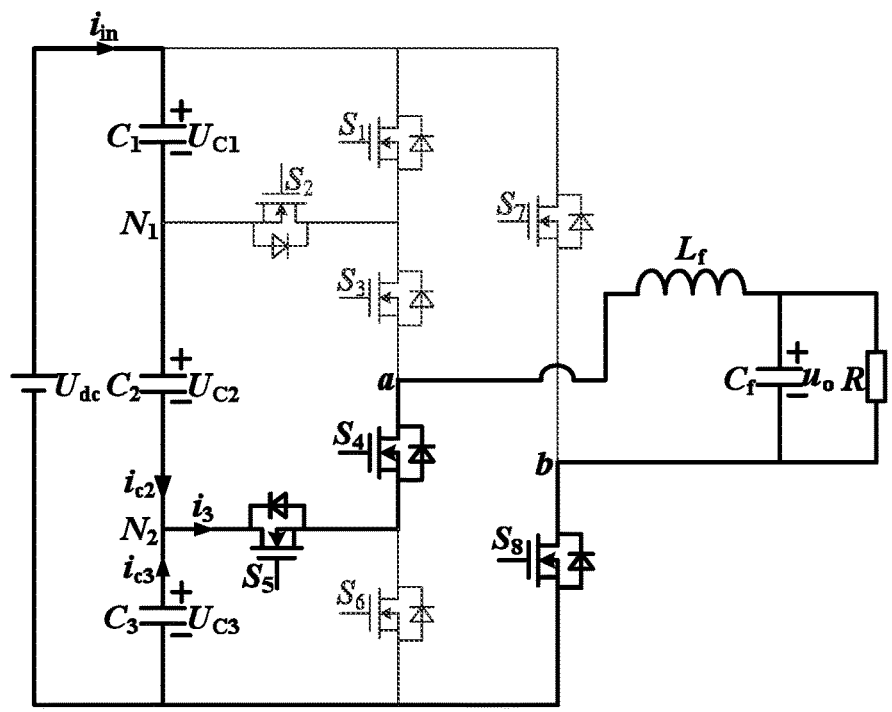
Figure 4D:
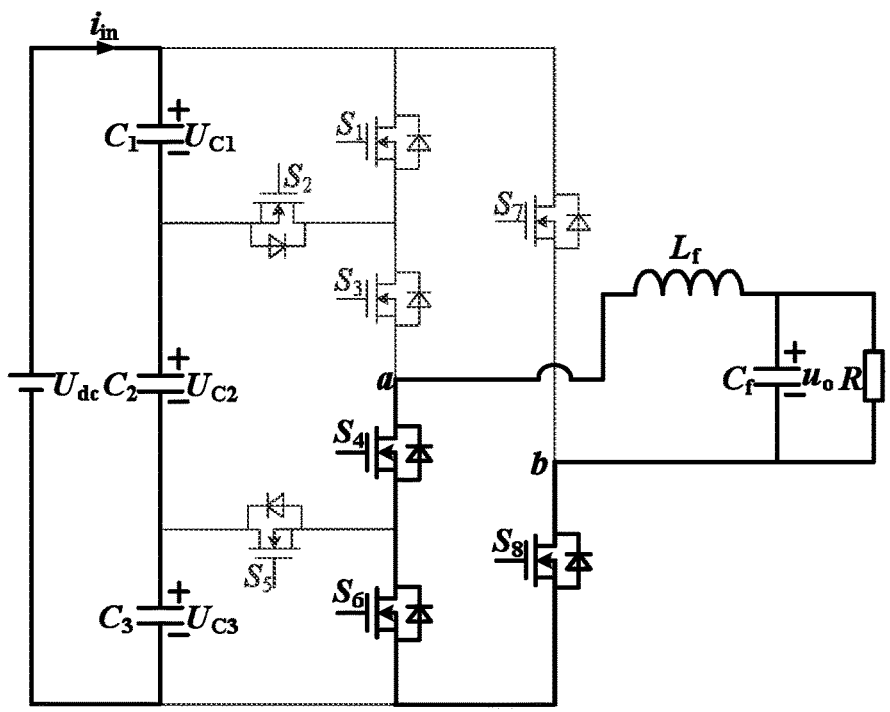
Figure 4E:
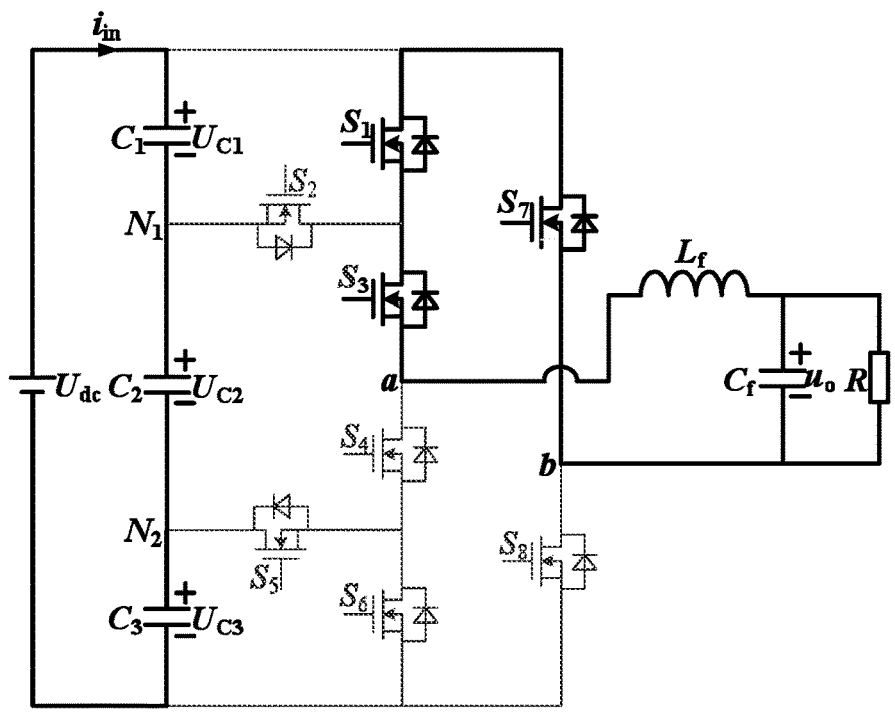
Figure 4F:
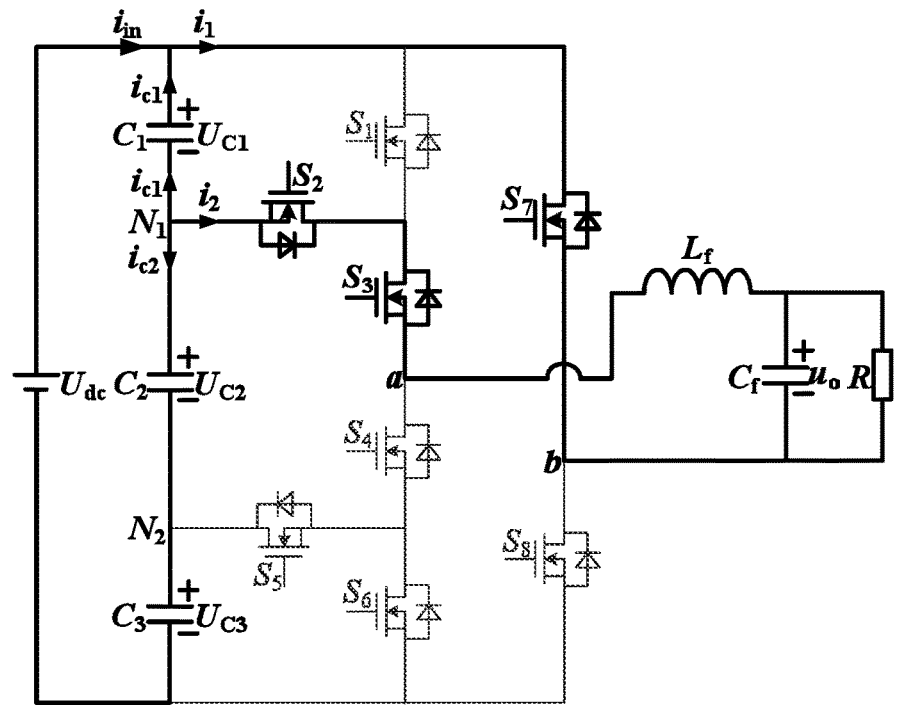
Figure 4G:
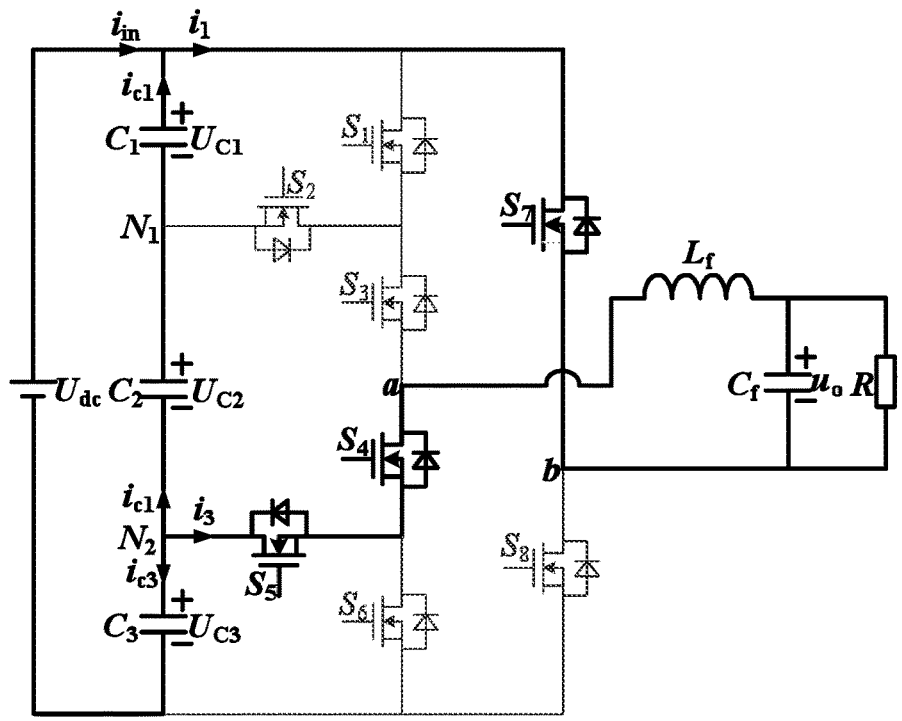
Figure 4H:
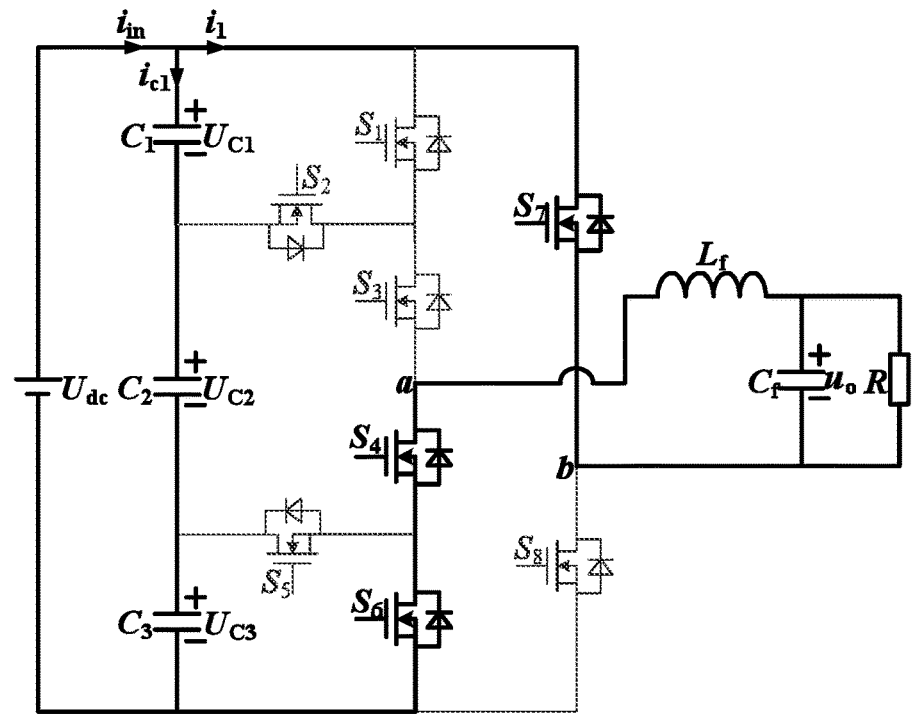
Figure 6:
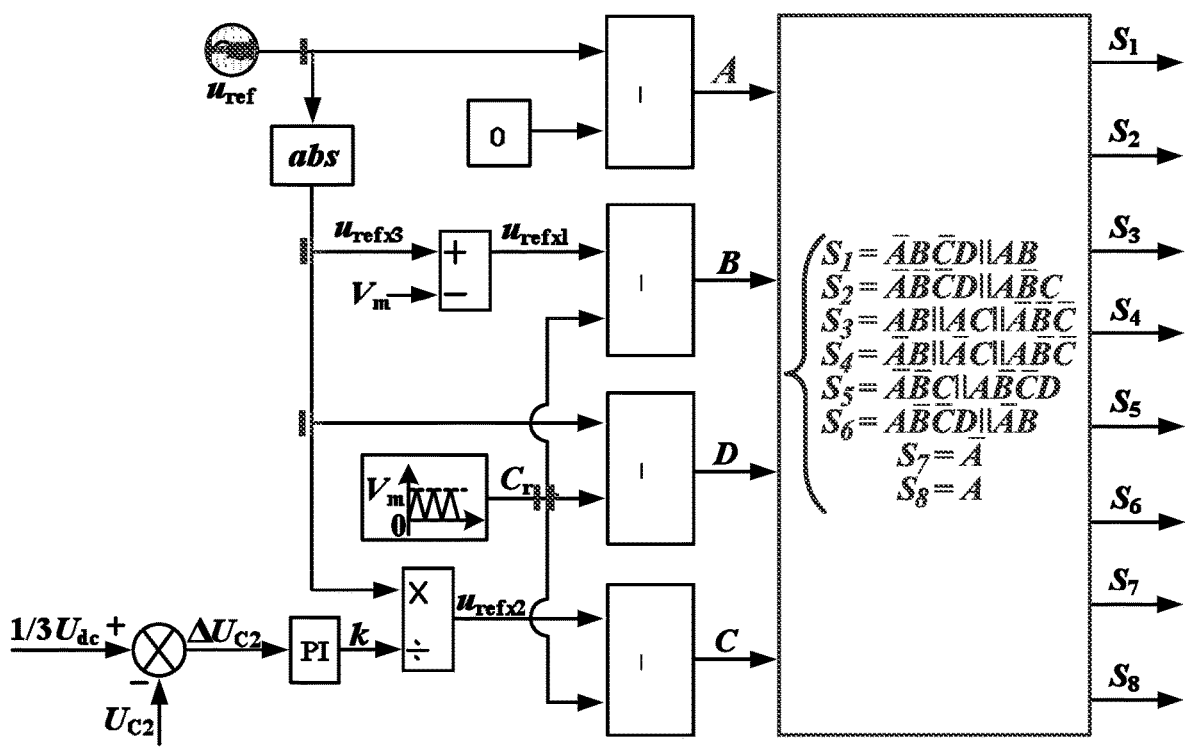
FIG. 6 illustrates a voltage-balance control scheme.

| Switching Stages | $S_1$ | $S_2$ | $S_3$ | $S_4$ | $S_5$ | $S_6$ | $S_7$ | $S_8$ | $u_{ab}$ | A | B | C | D | $C_1$ | $C_2$ | $C_3$ |
|---|---|---|---|---|---|---|---|---|---|---|---|---|---|---|---|---|
| FIG. 4(a) | 1 | 0 | 1 | 0 | 0 | 0 | 0 | 1 | $U_{dc}$ | 1 | 1 | X | X | Charge | Charge | Charge |
| FIG. 4(b) | 0 | 1 | 1 | 0 | 0 | 0 | 0 | 1 | 2/3 $U_{dc}$ | 1 | 0 | 1 | X | Charge | Discharge | Discharge |
| FIG. 4(c) | 0 | 0 | 0 | 1 | 1 | 0 | 0 | 1 | 1/3 $U_{dc}$ | 1 | 0 | 0 | 1 | Charge | Charge | Discharge |
| FIG. 4(d) | 0 | 0 | 0 | 1 | 0 | 1 | 0 | 1 | 0 | 1 | 0 | 0 | 0 | Charge | Charge | Charge |
| FIG. 4(e) | 1 | 0 | 1 | 0 | 0 | 0 | 1 | 0 | 0 | 0 | 0 | 0 | 0 | Charge | Charge | Charge |
| FIG. 4(f) | 0 | 1 | 1 | 0 | 0 | 0 | 1 | 0 | −1/3 $U_{dc}$ | 0 | 0 | 0 | 1 | Discharge | Charge | Charge |
| FIG. 4(g) | 0 | 0 | 0 | 1 | 1 | 0 | 1 | 0 | −2/3 $U_{dc}$ | 0 | 0 | 1 | X | Discharge | Discharge | Charge |
| FIG. 4(h) | 0 | 0 | 0 | 1 | 0 | 1 | 1 | 0 | −$U_{dc}$ | 0 | 1 | X | X | Charge | Charge | Charge |

Similarly, the average current $I_2$ is effective during the switching states of FIGS. 4B and 4F and it is expressed by:

$$I_2 = \frac{1}{2\pi}\left[\left(\int_{\theta_1}^{\theta_2} + \int_{\pi-\theta_2}^{\pi-\theta_1} + \int_{\pi}^{\pi+\theta_1} + \int_{2\pi-\theta_1}^{2\pi}\right)I_m\sin(\theta-\varphi)d\theta\right] \quad (8)$$

The average current $I_3$ is effective during the switching states of FIGS. 4C and 4G, and thus it is expressed by:

$$I_3 = \frac{1}{2\pi}\left[\left(\int_0^{\theta_1} + \int_{\pi-\theta_1}^{\pi} + \int_{\pi+\theta_1}^{\pi+\theta_2}\int_{2\pi-\theta_2}^{2\pi-\theta_1}\right)I_m\sin(\theta-\varphi)d\theta\right] \quad (9)$$

The formulas can be further simplified by:

$$I_1 = \frac{I_m}{\pi}\cos\varphi(1+\cos\theta_2) \quad (10)$$

$$I_2 = \frac{I_m}{\pi}\cos\varphi(2\cos\theta_1 - 1 - \cos\theta_2) \quad (11)$$

$$I_3 = \frac{I_m}{\pi}\cos\varphi(1+\cos\theta_2 - 2\cos\theta_1) \quad (12)$$

According to (4)-(12), there are:

$$I_{C1} = I_{dc} - \frac{I_m}{\pi}\cos\varphi(1+\cos\theta_2) \quad (13)$$

$$I_{C2} = I_{dc} - \frac{I_m}{\pi}\cos\varphi(2\cos\theta_1) \quad (14)$$

$$I_{C3} = I_{dc} - \frac{I_m}{\pi}\cos\varphi(1+\cos\theta_2) \quad (15)$$

The expressions (13)-(15) can be further simplified by:

$$I_{C1} = I_{C3} = I_{dc} - \frac{I_m}{\pi}\left(1 + \frac{\sqrt{9m^2-4}}{3m}\right)\cos\varphi \quad (16)$$

$$I_{C2} = I_{dc} - \frac{I_m}{\pi}\left(\frac{2\sqrt{9m^2-1}}{3m}\right)\cos\varphi \quad (17)$$

$I_{C1}$ and $I_{C3}$ are equal but not equal to $I_{C2}$. Though m, $I_m$, and φ have influence on $I_{C1}$, $I_{C2}$ and $I_{C3}$, only m has influence on the comparison of $I_{C1}$ (or $I_{C3}$) and $I_{C2}$. Furthermore, $$1 + \frac{\sqrt{9m^2-4}}{3m}$$

is smaller than $$\frac{2\sqrt{9m^2-1}}{3m}$$

when m is over ⅔. As a result, $I_{C1}$ and $I_{C3}$ are equal and higher than $I_{C2}$. The capacitors $C_1$ and $C_3$ are charged more while the capacitor $C_2$ is charged less if no additional voltage-balance circuit or voltage-balance control is applied. As can be shown, the voltage of $C_2$ drops down below zero while the other two capacitors $C_1$ and $C_3$ balanced.

When m is among (⅓, ⅔]:

The average current $I_1$ is only effective during the switching states of FIGS. 4F and 4G, and thus it is expressed by:

$$I_1 = \frac{1}{2\pi}\int_\pi^{2\pi}[-I_m\sin(\theta-\varphi)]d\theta \quad (18)$$

The average current $I_2$ is effective during the switching states of FIGS. 4B and 4F and thus it is expressed by:

$$I_2 = \frac{1}{2\pi}\left[\left(\int_{\theta_1}^{\pi-\theta_1} + \int_\pi^{\pi+\theta_1} + \int_{2\pi-\theta_1}^{2\pi}\right)I_m\sin(\theta-\varphi)d\theta\right] \quad (19)$$

The average current $I_3$ is only effective during the switching states of FIGS. 4C and 4G, and thus it is expressed by:

$$I_3 = \frac{1}{2\pi}\left[\left(\int_0^{\theta_1} + \int_{\pi-\theta_1}^{\pi} + \int_{\pi+\theta_1}^{2\pi-\theta_1}\right)I_m\sin(\theta-\varphi)d\theta\right] \quad (20)$$

The average currents $I_{C1}$, $I_{C2}$, $I_{C3}$ are obtained by $$I_{C1} = I_{C3} = I_{dc} - \frac{I_m}{\pi}\cos\varphi \quad (21)$$

$$I_{C2} = I_{dc} - \frac{I_m}{\pi}\frac{\sqrt{9m^2-1}}{3m}\cos\varphi \quad (22)$$

$I_{C1}$ and $I_{C3}$ are equal. As $$\frac{\sqrt{9m^2-1}}{3m}$$

is smaller than 1, $I_{C1}$ (or $I_{C3}$) is smaller than $I_{C2}$. It means the capacitors $C_1$ and $C_3$ are charged less while the middle capacitor $C_2$ is charged more. As a result, the middle capacitor voltage $U_{C2}$ takes the DC-link voltage while the other two capacitor voltages are discharged to be zero.

When m is among (0, ⅓]:

The average currents $I_1$ and $I_2$ are only effective during the switching state in FIG. 4F, and thus they can be expressed by:

$$I_1 = \frac{1}{2\pi}\int_\pi^{2\pi}[-I_m\sin(\theta-\varphi)]d\theta \quad (23)$$

$$I_2 = \frac{1}{2\pi}\int_\pi^{2\pi}I_m\sin(\theta-\varphi)d\theta \quad (24)$$

The average current $I_3$ is only effective during the switching state in FIG. 4C and thus it is expressed by:

$$I_3 = \frac{1}{2\pi}\int_0^\pi I_m\sin(\theta-\varphi)d\theta \quad (25)$$

The average currents $I_{C1}$, $I_{C2}$, $I_{C3}$ are obtained by:

$$I_{C1} = I_{C3} = I_{dc} - \frac{I_m}{\pi}\cos\varphi \tag{26}$$

$$I_{C2} = I_{dc} \tag{27}$$

$I_{C1}$ and $I_{C3}$ are equal and smaller than $I_{C2}$. The middle capacitor voltage $U_{C2}$ takes the total input DC-link voltage while the other two capacitor voltages are zero.

Thus, the capacitor voltage imbalance issue is related to the modulation index m and it is not related to $I_{dc}$, $I_m$, and φ. The middle capacitor voltage imbalance is the root cause of the three series-connected capacitor voltage imbalance issue. Specifically, the middle capacitor voltage $U_{C2}$ goes below zero due to the over discharge of $C_2$ when the modulation index m is over 2/3; $U_{C2}$ goes up to the total input DC-link voltage due to the over charge of $C_2$ when m is less than 2/3. The other two capacitor voltages $U_{C1}$ and $U_{C3}$ are automatically balanced no matter what m is.

It can be found in FIGS. 5A-5H and FIG. 6 that the two power switches of $S_7$, $S_8$ operate at the fundamental frequency while the other power switches operate at a high frequency.

Thus, a single-phase seven-level inverter is disclosed without clamping capacitors or diodes. Compared with the other topologies, the disclosed topology achieves seven output levels with reduced power components and reduced voltage stresses. As for the severe voltage imbalance issue, a voltage-balance control method is disclosed to control the middle capacitor voltage at the desire 1/3 of the DC-link voltage and then the other two DC-link capacitor voltages are automatically balanced. Overall, the disclosed topology and voltage-balance control strategy are simple and easy to implement, which enables it as a good alternative for grid-connected or standalone solar generation applications.

The over discharge or charge of the middle capacitor will result in the middle capacitor voltage imbalance and finally result in the capacitor voltage imbalance among the three series-connected capacitors. Thus, how to balance the middle capacitor voltage is important for voltage balancing control of the three capacitors. As can be seen in Table I, the switching states in FIGS. 4A, 4D, 4E and 4H do not result in the capacitor voltage imbalance of the three capacitors. However, the switching states in FIGS. 4B, 4C, 4F and 4G do have great influence on the middle capacitor voltage.

There are no redundant switching states that can be used to balance the three capacitor voltages. As summarized in Table I, the middle capacitor $C_2$ is discharged in FIG. 4B (2/3$U_{dc}$) and charged in FIG. 4C (1/3$U_{dc}$) while $C_1$ is charged and $C_3$ is discharged in FIGS. 4B and 4C. Also, $C_2$ is charged in FIG. 4F (−1/3$U_{dc}$) and discharged in FIG. 4G (−2/3$U_{dc}$) while $C_1$ is discharged and $C_3$ is charged in FIGS. 4F and 4G. $C_2$ is discharged and charged when achieving the two adjacent voltage levels of 2/3$U_{dc}$ and 1/3$U_{dc}$; and $C_2$ is charged and discharged when achieving the two adjacent voltage levels of −1/3$U_{dc}$ and −2/3$U_{dc}$. The charging time and discharging time for achieving the two adjacent voltage levels are different. By introducing one of the two adjacent voltage levels into the other one, a three-level voltage waveform is developed in every switching period. Thus, the middle capacitor voltage could be controlled at a desired value (for example, 1/3$U_{dc}$). To achieve this goal, a variable-reference voltage balancing method is disclosed and, referring to in FIG. 6 where the reference signal $u_{ref}$ is defined by the formula (28). In (28), m is the modulation index; $f_m$ is the fundamental frequency and $V_m$ is the amplitude of the only one triangular carrier $C_r$.

$$u_{ref}=2mV_m \sin(2\pi f_m t) \tag{28}$$

As there is no need to control the capacitor voltages of $C_1$ and $C_3$, two reshaped reference signals $u_{ref1}$ and $u_{ref2}$ are given in (29) and (31). One more reference signal $u_{ref2}$ is obtained in (30) where k is the output of a proportional-integration (PI) regulator.

$$u_{ref1} = |u_{refx}| - V_m \tag{29}$$

$$u_{ref2} = \frac{|u_{refx}|}{k} \tag{30}$$

$$u_{ref3} = |u_{refx}| \tag{31}$$

As shown in FIG. 7, the PI regulator is used to control the middle capacitor voltage at the desired 1/3$U_{dc}$. The input of the PI regulator is the voltage difference $\Delta U_{C2}$ defined by $$\Delta U_{C2} = \frac{1}{3}U_{dc} - U_{C2} \tag{32}$$

The modulation index of $u_{refx2}$ is m/k, which is a variable value due to the output (k) of the PI regulator. This PI regulation process is similar to the voltage-oriented closed loop control of a three-phase two-level inverter. m/k could ensure the reference signal $u_{refx2}$ varies within the scope of the carrier signal. Thus, the two adjacent voltage levels (2/3$U_{dc}$ and 1/3$U_{dc}$) or (−1/3$U_{dc}$ and −2/3$U_{dc}$) can appear during every switching period. Thus, the traditional two-level voltage waveform in every switching period is changed by a three-level voltage waveform in the variable-reference voltage-balance control method. The charging and charging states of the middle capacitor $C_2$ could both happen in every switching period. Therefore, the middle capacitor voltage can be controlled at any voltage values. As the balanced capacitor voltages are desired, the middle capacitor voltage $U_{C2}$ can be balanced at 1/3$U_{dc}$. In the meanwhile, the other two capacitor voltages $U_{C1}$ and $U_{C3}$ are automatically balanced according to the theoretical analysis in Section III. Finally, the three capacitor voltages $U_{C1}$, $U_{C2}$ and $U_{C3}$ are balanced.

Figure 9A:
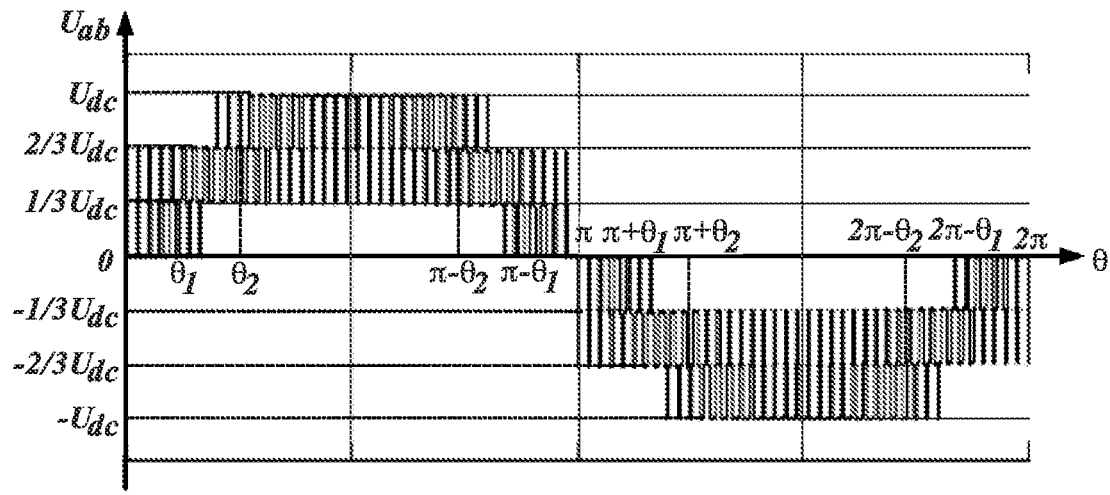
FIGS. 9A and 9B illustrate desired voltage waveform of the disclosed SANPC-7L inverter.
Figure 9B:
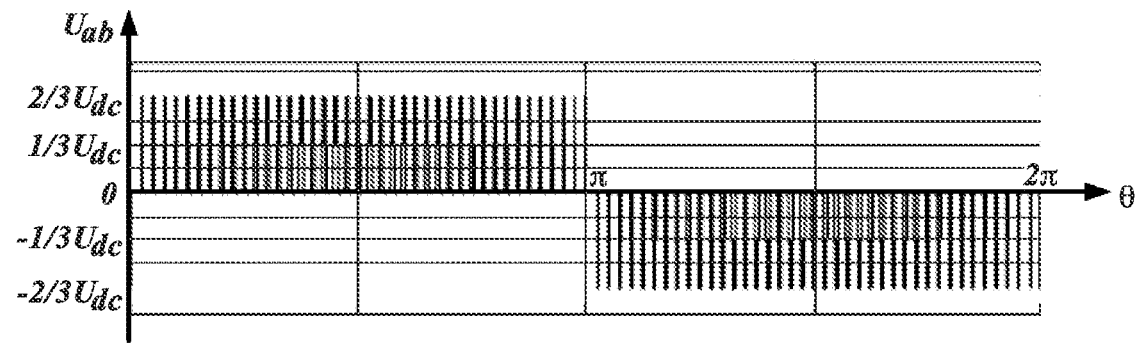

The desired voltage waveform of the disclosed SANPC-7L inverter with the variable-reference voltage-balance method is given in FIGS. 9A and 9B. During the positive fundamental period, the voltage level 2/3$U_{dc}$ accompanies the voltage level 1/3$U_{dc}$ in every switching period. During the negative fundamental period, −2/3$U_{dc}$ accompanies −1/3$U_{dc}$ in every switching period. Thus, there are still seven voltage levels ($U_{dc}$, 2/3$U_{dc}$, 1/3$U_{dc}$, 0, −1/3$U_{dc}$, −2/3$U_{dc}$, −$U_{dc}$) when m is among (0.5, 1), while there are five voltage levels (2/3$U_{dc}$, 1/3$U_{dc}$, 0, −1/3$U_{dc}$, −2/3$U_{dc}$) when m is among (0, 0.5]. Therefore, compared with FIGS. 7A-7C, there are only two conditions when using the variable-reference voltage-balance control method: 1) m is among (0.5, 1); 2) m is among (0, 0.5].

The disclosed topology is a single-phase active neutral point clamped seven-level (SANPC-7L) inverter topology with only eight power switches and three DC-link capacitors. Compared to existing single-phase seven-level inverters, quantity of power switches and voltage stresses across them are both reduced. Modulation logic expression of every power switch is achieved based on Karnaugh Map technique. Like the existing single-phase seven-level inverters with three series-connected DC-link capacitors, there is a severe capacitor voltage imbalance issue, which is addressed recognizing that there are no redundant switching states that can be selected to control and balance the DC-link capacitor voltages. The disclosure gives a comprehensive analysis on the capacitor voltage imbalance issue and indicates that the middle capacitor voltage imbalance is the root cause of this issue while the upper and lower capacitor voltages could be automatically balanced. A variable-reference voltage-balance control method is used to enable a three-level voltage waveform to appear in every switching period and thus the middle capacitor voltage can be controlled at ⅓ of the DC-link voltage.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of the principles of this application. This description is not intended to limit the scope or application of the claim in that the assembly is susceptible to modification, variation, and change, without departing from spirit of this application, as defined in the following claims.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than those provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A single-phase active neutral point clamped seven-level (SANPC-7L) inverter coupled to a DC source, comprising:
    a neutral point clamped inverter;
    a half-bridge, wherein the neutral point clamped inverter and the half-bridge includes eight power switches; and
    three DC-link capacitors that synthesize seven output voltage levels;
    wherein the neutral point clamped inverter is a four-level active neutral pointed clamped inverter (4L-ANCP) that includes six power switches of the eight power switches and is operated at a switching frequency with a first voltage stress level;

the half-bridge includes the other two of the eight power switches coupled to the 4L-ANCP and operated at a fundamental frequency with a second voltage stress, the second voltage stress being higher than the first voltage stress level; and a voltage balance controller is configured to utilize three reference signals and one carrier signal, the one carrier signal is a triangular carrier signal; and wherein the three reference signals are defined by:

$$u_{ref}=2mV_m \sin(2\pi f_m t);$$

where m is a modulation index, $f_m$ is the fundamental frequency of the inverter, and $V_m$ is an amplitude of one of the three reference signals defined by:

$$u_{ref1}=|u_{refx}|-V_m;$$

$$u_{ref2}=|u_{refx}/k|; \text{ and}$$

$$u_{ref3}=|u_{refx}|;$$

where $U_{refx}$ is a total input of the one of the three reference signals, k is an output of a proportional integration (PI) regulator, and t is a charging time.

2. The inverter of claim 1, wherein the fundamental frequency is lower than the switching frequency.

3. The inverter of claim 2, wherein the fundamental frequency is 50 Hz or 60 Hz.

4. The inverter of claim 1, wherein the voltage-balance controller controls and balances a middle DC-link capacitor voltage at ⅓ of a target DC-link voltage.

5. The inverter of claim 4, wherein two DC-link capacitor voltages that are not the middle DC-link capacitor voltage are automatically balanced.

6. The inverter of claim 5, wherein a modulation logic expressions of each of the eight power switches are derived based on a Karnaugh Map technique.

7. A system comprising:
a single DC source;
an inverter coupled to the single DC source, the inverter including seven levels comprising:
  a four-level active neutral pointed clamped inverter (4L-ANCP) that includes six power switches operated at a switching frequency with a first voltage stress level;
  a half-bridge that includes two power switches is coupled to the 4L-ANCP and operated at a fundamental frequency with a second voltage stress, the second voltage stress being higher than the first voltage stress level; and
  three DC-link capacitors that synthesize seven output voltage levels; and
a voltage balance controller is configured to utilize three reference signals and one carrier signal, the carrier signal is a triangular carrier signal; and
wherein the three reference signals are defined by:

$$u_{ref}=2mV_m \sin(2\pi f_m t);$$

where m is a modulation index, $f_m$ is the fundamental frequency of the inverter, and $V_m$ is an amplitude of one of the three reference signals defined by:

$$u_{ref1}=|u_{refx}|-V_m;$$

$$u_{ref2}=|u_{refx}/k|; \text{ and}$$

$$u_{ref3}=|u_{refx}|;$$

where $U_{refx}$ is a total input of the one of the three reference signals, k is an output of a proportional integration (PI) regulator, and t is a charging time.

8. The system of claim 7, wherein a modulation logic expressions of each of the eight power switches are derived based on a Karnaugh Map technique.

9. A system comprising:
a single DC source;
eight power switches, wherein a modulation logic expression of each of the eight power switches is based on a Karnaugh Map technique;
three DC-link capacitors that synthesize seven output voltage levels;
a four-level active neutral pointed clamped inverter (4L-ANCP) that includes six power switches of the eight power switches is operated at a switching frequency with a first voltage stress level;
a half-bridge that includes the other two of the eight power switches is coupled to the 4L-ANCP and operated at a fundamental frequency with a second voltage stress, the second voltage stress being higher than the first voltage stress level; and
a voltage balance controller is configured to utilize three reference signals and one carrier signal, the carrier signal is a triangular carrier signal;
wherein the three reference signals are defined by:

$$u_{ref}=2mV_m \sin(2\pi f_m t);$$

where m is a modulation index, $f_m$ is the fundamental frequency of the inverter, t is a charging time, and V, is an amplitude of one of the three reference signals defined by:

$$u_{ref1}=|u_{refx}|-V_m;$$

$$u_{ref2}=|u_{refx}/k|; \text{ and}$$

$$u_{ref3}=|u_{refx}|;$$

where $U_{refx}$ is a total input of the one of the three reference signals, and k is an output of a proportional integration (PI) regulator.

10. The system of claim 9, wherein:
the modulation logic expression of each of the eight power switches based on the Karnaugh Map technique is:

$$S_1 = \overline{ABCD} \,||\, AB$$

$$S_2 = \overline{ABCD} \,||\, A\overline{B}C$$

$$S_3 = AB \,||\, AC \,||\, \overline{ABC}$$

$$S_4 = \overline{A}B \,||\, \overline{A}C \,||\, \overline{ABC}$$

$$S_5 = \overline{ABC} \,||\, \overline{ABC}D$$

$$S_6 = A\overline{BCD} \,||\, \overline{A}B$$

$$S_7 = \overline{A}$$

$$S_8 = A$$

where A, B, C, & D are four logical output signals, and $S_1$-$S_8$ are the first through eighth switches, respectively.

11. The system of claim 10, wherein the three DC-link capacitors are in series and at least one of the DC-link capacitors provides energy to a load while the other DC-link capacitors are charged by the single DC source.

12. The system of claim 10, wherein the three DC-link capacitors are in series and charged by the single DC source.

* * * * *

UNITED STATES PATENT AND TRADEMARK OFFICE
CERTIFICATE OF CORRECTION

| | | |
|---|---|---|
| PATENT NO. | : 12,107,515 B2 | |
| APPLICATION NO. | : 17/780225 | |
| DATED | : October 1, 2024 | |
| INVENTOR(S) | : Jianfei Chen et al. | |

It is certified that error appears in the above-identified patent and that said Letters Patent is hereby corrected as shown below:

In the Claims

At Column 14, Claim number 10, Line number 54, the claim reads:
$S_4 = \bar{A}B \,||\, \bar{A}C \,||\, \overline{ABC}$.
This line should read:
"$S_4 = \bar{A}B \,||\, \bar{A}C \,||\, A\overline{BC}$."

Signed and Sealed this
Twelfth Day of November, 2024

Katherine Kelly Vidal
*Director of the United States Patent and Trademark Office*